United States Patent [19]

Masnari et al.

[11] 4,323,420
[45] Apr. 6, 1982

[54] PROCESS FOR MANUFACTURE OF INERTIAL CONFINEMENT FUSION TARGETS AND RESULTING PRODUCT

[75] Inventors: Nino A. Masnari; Walter B. Rensel; Merrill G. Robinson; David E. Solomon; Kensall D. Wise, all of Ann Arbor; Gilbert H. Wuttke, Ypsilanti Township, Washtenaw County, all of Mich.

[73] Assignee: The United States of America as represented by the United States Department of Energy, Washington, D.C.

[21] Appl. No.: 925,437

[22] Filed: Jul. 17, 1978

[51] Int. Cl.$^3$ ............................................. G21B 1/00
[52] U.S. Cl. ................................ 156/628; 156/633; 156/659.1; 156/662; 376/152
[58] Field of Search ................... 176/1; 156/628–630, 156/633, 657, 659, 662; 273/58 B, 58 BA

[56] References Cited

U.S. PATENT DOCUMENTS

| | | | |
|---|---|---|---|
| 1,240,438 | 9/1917 | Griffiths | 273/58 BA |
| 2,975,547 | 3/1961 | Greve | 273/58 B |
| 3,689,357 | 9/1972 | Jordan | 156/629 |
| 4,034,032 | 7/1977 | Hendricks . | |
| 4,038,125 | 7/1977 | Fries et al. . | |

OTHER PUBLICATIONS

UCRL-50021-78, 3/79, pp. (4-51).
UCRL-76679, 10/75, pp. 1-14.
IBM Technical Disclosure Bulletin, vol. 19, No. 3, 8/76, pp. 930-931, Gibney et al.
Nuclear Fusion, vol. 15, 1975, pp. 333-335, Kirkpatrick et al.
Physics Today, 3/75, pp. 17, 18.
UCRL-50021-76, 6/77, pp. (4-122)-(4-176), (4-136)-(4-140), (4-187)-(4-191).
LA-UR-76-2427, 11/76, Farnum et al., pp. 1-16.

*Primary Examiner*—Harvey E. Behrend

[57] ABSTRACT

An ICF target comprising a spherical pellet of fusion fuel surrounded by a concentric shell; and a process for manufacturing the same which includes the steps of forming hemispheric shells of a silicon or other substrate material, adhering the shell segments to each other with a fuel pellet contained concentrically therein, then separating the individual targets from the parent substrate. Formation of hemispheric cavities by deposition or coating of a mold substrate is also described. Coatings or membranes may also be applied to the interior of the hemispheric segments prior to joining.

8 Claims, 5 Drawing Figures

PROCESS FOR MANUFACTURE OF INERTIAL CONFINEMENT FUSION TARGETS AND RESULTING PRODUCT

The invention described herein was made in the course of, or under, a contract with the U.S. Energy Research and Development Administration.

The present invention is directed to targets for inertial confinement fusion (ICF) reactions and to processes for manufacture thereof.

Prior art techniques for providing ICF targets have generally been directed to low volume production of targets for research facilities, and have not been readily adaptable for high-volume low-cost production for commercial reactor systems. Accordingly, an object of the present invention is to overcome this deficiency in the prior art and to provide a process for manufacture of ICF targets which is readily adaptable for high volume production of low cost targets in a wide variety of sizes.

A further object of the invention is to provide a process for manufacture of ICF targets which takes advantage of current technology utilized in production of solid-state integrated electronic circuits.

A further object of the invention is to provide an improved low cost ICF target.

The invention, together with additional objects, features and advantages thereof, will be best understood from the following description, the appended claims and the accompanying drawings in which:

Figure 1:
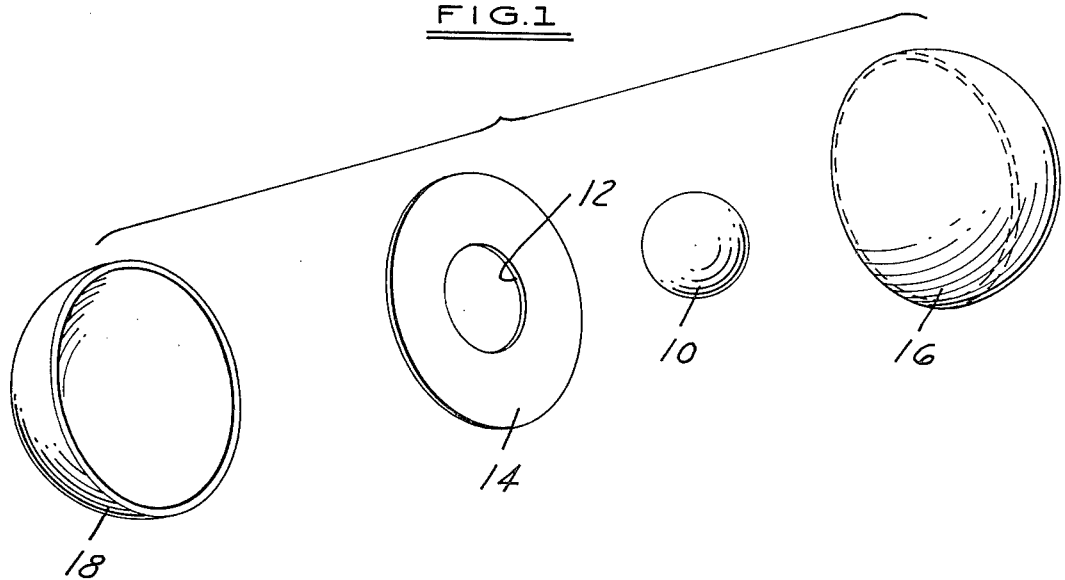
FIG. 1 is an exploded view of a presently preferred embodiment of an ICF target provided in accordance with the invention.
Figure 2:
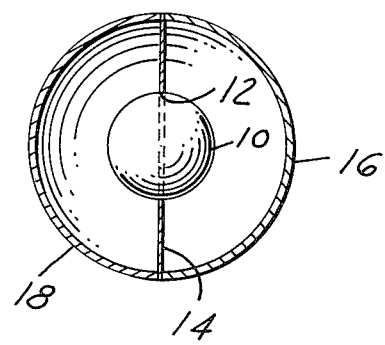
FIG. 2 is a sectional view bisecting the target illustrated in FIG. 1.

REFERRING TO FIGS. 1 and 2, an ICF target in accordance with the invention includes a spherical pellet 10 such as a glass sphere or a shell containing fusion fuel (such as deuterium and tritium). Fuel pellet 10 may be provided in accordance with any one of a number of conventional techniques of which that disclosed in the United States patent of Smith et al. U.S. Pat. No. 3,953,617 is exemplary. Fuel pellet 10 is located and held within the central aperture 12 of a support membrane 14. A spherical shell is formed by a pair of opposed hemispheric shell segments 16,18 provided in accordance with the invention. As best seen in FIG. 2, membrane 14 is captured or sandwiched between and thus joins the opposed hemispheres such that fuel pellet 10 is effectively supported by membrane 14 concentrically within the protective shell.

Figure 3:
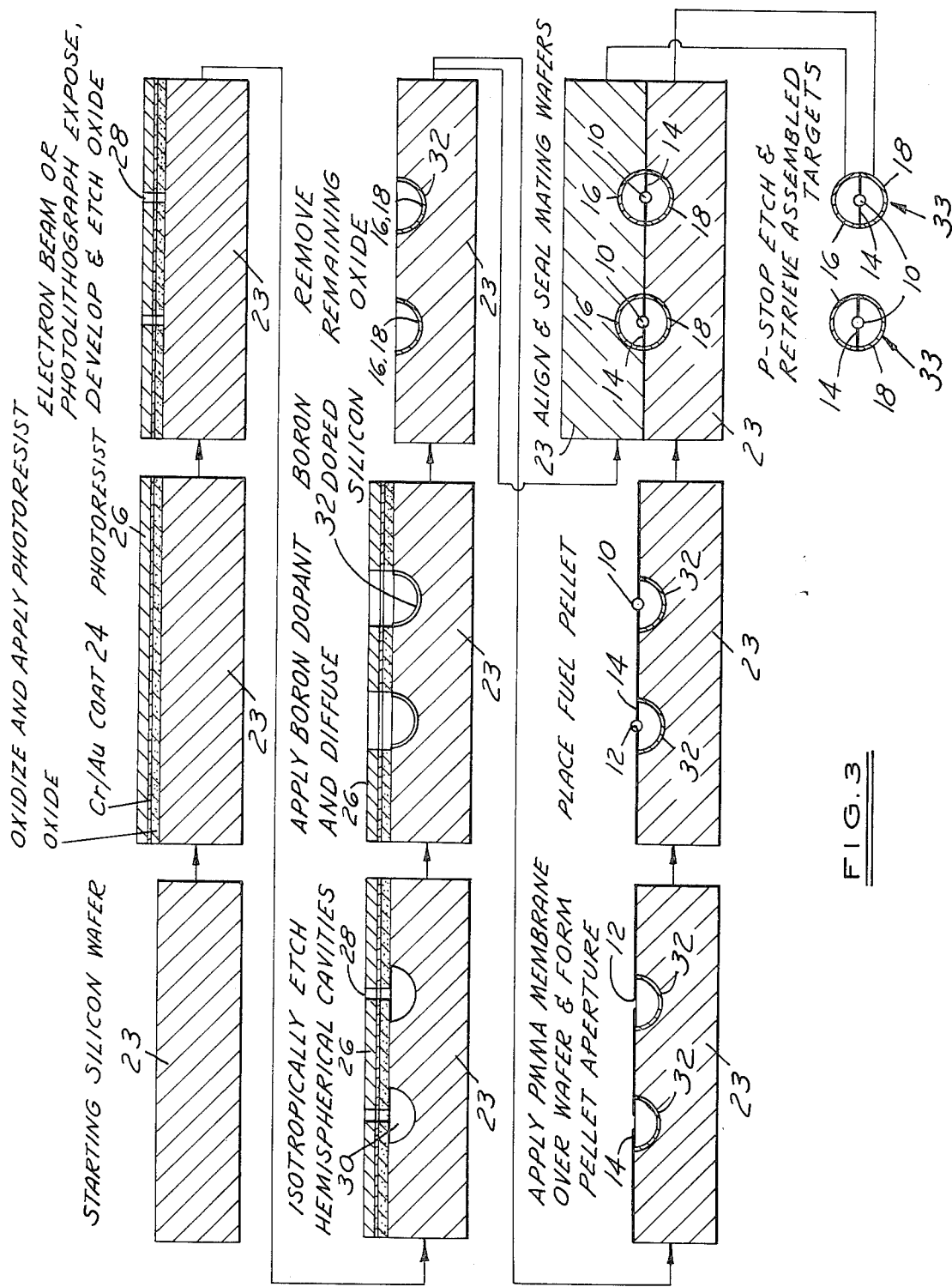
FIG. 3 illustrates presently preferred processes for manufacture of the ICF target illustrated in FIGS. 1 and 2.

The presently preferred process for manufacture of shell segments 16,18 is illustrated in FIG. 3. A planar wafer 23 of silicon, for example, is first oxidized, and then one or more discrete layers 24,26 of metal film and photoresists are deposited on the silicon material. The substrate materials are then processed by photolithographic or electron-beam-lithographic exposure and development to form a mask for the underlying substrate comprising a pattern of circular access openings 28 in metal films 24,26. Openings 28 may have a diameter on the order of 125 microns or one-fourth the diameter of the desired hemispherical cavity, for example. The substrate material 23 beneath access opening 28 is then exposed to a conventional isotropic chemical etchant to form hemispheric pockets or cavities 30. The films 24,26 are then removed from the oxidized silicon substrate 23 to form a substrate mold having a plurality of hemispheric pockets 30 disposed therein.

The substrate mold may then be doped by diffusion or ion implantation with an etch resistant agent such as boron, as at 32, ultimately to yield shell segments 16,18 of substrate material, i.e., silicon. After boron doping of the cavities, all remaining oxide may be stripped from the wafer and the membranes 14 applied over the shell segments. The central apertures 12 (FIG. 3) are located and formed in the membranes 14 by means of a computer controlled electron beam. In mass production of shells having the configuration illustrated in FIGS. 1 and 2, it is contemplated that substrate wafers with the hemispherical shell segments still integral therewith may be coated with a membrane of material on the order of a hundred nanometers thick. After centering a fuel pellet 10 (FIGS. 1, 2 and 3) in each membrane aperture 12, the mating wafers are joined and sealed in sandwiched relation. The substrates are then removed by etching of the undoped silicon and the shells are separated to yield thousands of target assemblies 33 per pair of wafer substrates.

Figure 4:
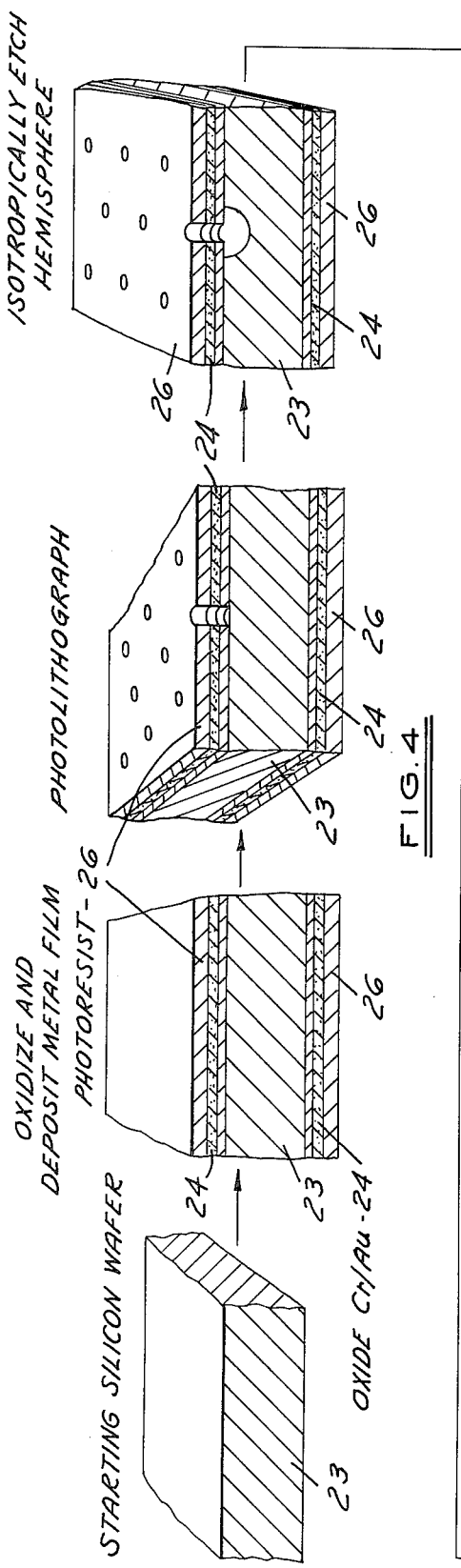
FIGS. 4 and 5 collectively illustrate an alternative process in accordance with the invention.
Figure 5:
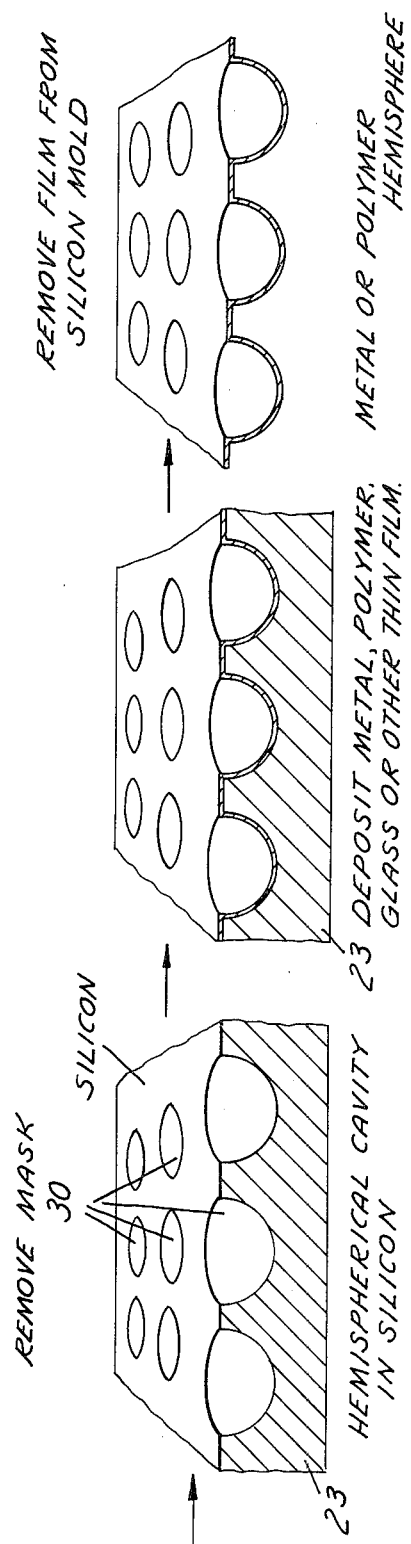

Alternatively, as illustrated in FIGS. 4 and 5, discrete film or layer of desired shell material may be formed by electrodeposition or the like over the mold surface and cavity. Where the film is non-adherent or a mold release agent is used, the layer may be removed from the silicon mold and the hemispheric segments cut or preferentially removed therefrom. The mold substrate 23 may then be reused. Hemispheres may be formed in accordance with the invention of single-crystal silicon, germanium, silicon dioxide, gold, copper, chromium and single crystalline materials. Sizes ranging from hundreds to thousands of microns in diameter are contemplated. It is also envisioned that the process already demonstrated in accordance with the invention may be extrapolated to produce hemispheric shells in the millimeter size range.

Reference: Weber et al., "Scanning Electron-Beam System Turns Out IC-Wafers Fast", *IBM Corporation Electronics*, Nov. 10, 1977; Yew, "Electron Beam-Now a Practical LSI Production Tool", *Solid State Technology*, Vol. 20, No. 8, 1977

We claim:

1. In a process for manufacture of fusion fuel targets comprising the steps of: (a) forming a pair of hemispheric shell segments, (b) suspending a spherical pellet of fusion fuel within one of said shell segments, and (c) joining the shell segments to each other with said pellet being contained concentrically therewithin, the improvement for production of said targets in quantity wherein said step (a) comprises the steps of:
   (d) forming a plurality of hemispheric mold cavities in a substrate material by
      (d1) depositing a metal film on a working surface of said substrate material,
      (d2) photolithographically or electron-beam lithographically forming in said metal film a mask for the underlying substrate material,
      (d3) etching said underlying substrate material through said mask to form a plurality of hemispheric mold cavities in said substrate material, and then (d4) removing said mask to expose said working surface including said hemispheric mold cavities, (e) forming in each of said mold cavities a thin film of desired shell material, and (f) removing said films from said mold cavities to form said plurality of hemispheric shell segments.

2. The process set forth in claim 1 wherein said step (e) comprises the step of doping said substrate material with an etch resistant agent to form a layer of doped substrate material of uniform thickness adjacent said working surface; and wherein said step (f) comprises the step of removing said substrate material excluding said layer in a chemical etching operation leaving said plurality of shell segments in the form of a film and consisting essentially of doped substrate material.

3. The process set forth in claim 1 wherein said step (e) comprises the step of depositing a discrete layer of desired shell material at uniform thickness on said working surface including said mold cavities; and wherein said step (f) comprises the step of mechanically removing said discrete layer while leaving said substrate and said working surface intact, such that formation and removal of two said layers yields a plurality of hemispheric shell segments in matched pairs consisting of two said hemispheric shell segments formed in the same said mold cavity in successive formation and removal operations.

4. The process set forth in claim 1, 2 or 3 wherein said step (b) comprises the steps of: (g) forming a plurality of centrally apertured membranes and (h) locating a plurality of said pellets one in each of the membrane apertures; and wherein said step (c) comprises the step of adhering pairs of said segments to each other with a said membrane positioned therebetween.

5. The process set forth in claim 1 or 2 wherein said substrate material is silicon.

6. The process set forth in claim 5 wherein said shell segments are constructed of material selected from the group consisting of single-crystal silicon, germanium, silicon dioxide, gold, copper, chromium and plastic.

7. A process for manufacturing fusion fuel targets in quantity comprising the steps of:
(a) selecting a substrate material of silicon construction having a flat working surface,
(b) depositing a metal film on said working surface,
(c) forming a mask for the underlying substrate material by lithographically forming a plurality of circular openings in said film,
(d) etching said underlying substrate material through said mask openings to form in said material a plurality of mold cavities having concave hemispheric surfaces opening onto said flat working surface,
(e) removing said mask,
(f) doping said working surface including said concave hemispheric surfaces of said cavities with a boron etch resistant agent to form a layer of doped substrate material of uniform thickness beneath said working and hemispheric surfaces,
(g) removing that portion of said substrate excluding said layer of doped substrate material in a chemical etching operation to form an integral sheet consisting essentially of doped substrate material and including a plurality of hemispheric shell segments corresponding to said plurality of mold cavities, and
(h) joining shell segments to each other in pairs with a spherical pellet of fusion fuel contained concentrically within each said pair.

8. A process for manufacture of fusion fuel targets in quantity comprising the steps of:
(a) selecting a pair of substrates each having a flat working surface,
(b) depositing a metal film on each said working surface,
(c) lithographically forming in each said metal film a mask for the underlying substrate material as comprising a plurality of circular access openings, the masks in said pair of substrates being mirror images of each other,
(d) etching the underlying material in each said substrate through said access openings to form in each said substrate a plurality of hemispheric mold cavities,
(e) removing said mask from each said substrate,
(f) doping each said working surface including said cavities to a uniform depth beneath each said surface with an etch resistant agent,
(g) applying a membrane over one of said working surfaces covering said cavities,
(h) forming a plurality of circular openings in said membrane with each said opening being located centrally of a corresponding said cavity in said one working surface,
(i) mounting in each said membrane opening a spherical pellet of fusion fuel,
(j) joining said substrates with said working surfaces in opposed facing relation and with each hemispheric cavity in one substrate aligned with a corresponding cavity in the other substrate with a corresponding membrane-mounted fuel pellet being disposed therebetween, and
(k) chemically etching said joined substrates to remove undoped substrate material to yield a plurality of fuel targets each consisting of a fusion fuel pellet mounted by a membrane concentrically within opposing shell segments of doped substrate material.

* * * * *